United States Patent [19]

Ritzmann et al.

[11] 4,257,766
[45] Mar. 24, 1981

[54] PROCESSES AND APPARATUS FOR THE HEAT TREATMENT OF FINE-GRAINED MATERIAL

[75] Inventors: Horst Ritzmann, Enniger; Klaus Bauer, Oelde; Heinz-Herbert Schmits, Rheda; Wolf Goldmann; Hennig Korn, both of Neubeckum, all of Fed. Rep. of Germany

[73] Assignee: Polysius AG, Beckum, Fed. Rep. of Germany

[21] Appl. No.: 960,939

[22] Filed: Nov. 15, 1978

[30] Foreign Application Priority Data

Nov. 23, 1977 [DE] Fed. Rep. of Germany ....... 2752323

[51] Int. Cl.³ .......................... C04B 7/36; F27B 15/00
[52] U.S. Cl. ......................................... 432/14; 432/58; 432/106; 106/100
[58] Field of Search ..................... 432/14, 15, 106, 58; 106/100

[56] References Cited

U.S. PATENT DOCUMENTS

| 3,873,331 | 3/1975 | Kondo et al. | 432/15 |
| 3,904,353 | 9/1975 | Bosshard et al. | 432/58 |
| 4,004,876 | 1/1977 | Sylvest | 432/58 |
| 4,014,641 | 3/1977 | Shigeyoshi et al. | 432/58 |
| 4,094,626 | 6/1978 | Boyhont et al. | 432/106 |
| 4,105,396 | 8/1978 | Ritzmann | 432/14 |

FOREIGN PATENT DOCUMENTS 2272359 12/1975 France .

Primary Examiner—Henry C. Yuen
Attorney, Agent, or Firm—Learman & McCulloch

[57] ABSTRACT

Processes and apparatus for the heat treatment of fine-grained material, particularly for the production of cement, wherein the material is preheated in a preheater, further heated in a precalcination zone using additional fuel, calcined to completion in a rotary kiln, and cooled in a cooler, the preheated material being introduced into a cooling air stream run off from the cooler and the resulting mixture of gas and solids being introduced from the side into a gas pipe which connects the rotary kiln to the preheater and through which the kiln exhaust gases flow in the upward direction.

21 Claims, 3 Drawing Figures

PROCESSES AND APPARATUS FOR THE HEAT TREATMENT OF FINE-GRAINED MATERIAL

BACKGROUND OF THE INVENTION

In the heat treatment of fine-grained material, particularly in the production of cement, and to relieve the rotary kiln as far as possible of the responsibility of supplying the heat required for calcining the material and, hence, to enable it to be made smaller in size, it is known that the rotary kiln may be preceded by a precalcination zone in which the material already preheated in several stages of the preheater is further heated (and hence largely calcined) before it subsequently enters the rotary kiln. The precalcination zone has to be supplied with fuel and with a combustion medium of sufficient oxygen content to support combustion.

It is known that oxygen-containing kiln exhaust gases, a cooling air stream run off from the cooler of the installation, or a mixture of kiln exhaust gases and cooler air may be delivered as a gaseous combustion medium to the precalcination zone. The particular difficulty of this method of precalcination lies in quickly transferring the heat content of the additional fuel to the material as completely and as uniformly as possible.

In one known installation (cf. "Zement-Kalk-Gips" 1970, 250), the fine-grained material being preheated in several stages of the cyclone preheater, additional fuel and a cooling air stream run off from the cooler are introduced into the gas pipe which connects the rotary kiln to the cyclone preheater and which carries the kiln exhaust gases. Hence, this gas pipe forms the actual precalcination zone. In order to obtain an adequate transfer of heat from the fuel to the gas in this precalcination zone in spite of the non-optimal admixture of fuel, material, cooler air, and kiln exhaust, the gas pipe in question has to be made relatively long which increases the space occupied by the installation and adds to the construction costs.

In another known process (German Offenlegungsschrift No. 2,506,580), the preheated material, the additional fuel, and the cooling air stream run off from the cooler are delivered to an auxiliary furnace in which the additional fuel is burnt and the material precalcined. From this auxiliary furnace the material and gas then enter the gas pipe through which the exhaust gases of the rotary kiln flow and which leads to the lowermost stage of the cyclone preheater. The main disadvantages of this known process lie in the considerable outlay involved in providing an additional auxiliary furnace as the actual precalcination zone.

The objects of the present invention are to provide processes and apparatus of the type described above in which, despite minimal outlay on plant for the precalcination zone, heat is transferred as completely as possible and, in particular, as uniformly as possible from the fuel to the material.

SUMMARY OF THE INVENTION

According to the invention, these objects are achieved in that the cooling air stream run off from the cooler is divided up into several component streams which are introduced at different peripheral points into the gas pipe carrying the kiln exhaust gases and forming the precalcination zone, and in that corresponding partial quantities of the preheated material are introduced into the component streams of cooling air immediately before they enter the kiln exhaust pipe.

In the process according to the invention, in contrast to the prior art as represented by ZKG 1970, 250, the preheated material is initially broken up in the cooling air stream before being introduced by this cooling air stream into the kiln exhaust gas stream. This prevents undesirable agglomerations of material from building up in the kiln exhaust pipe and creates ideal preconditions in this kiln exhaust pipe for the uniform heat treatment of all the particles of material.

However, in the process according to the invention, in contrast to the prior art as represented by DT-OS No. 2,506,580, the actual precalcination process takes place in the kiln exhaust pipe itself and not in a separate combustion chamber arranged alongside the kiln exhaust pipe. By virtue of the fact that, in this way, a part of the installation necessary in any case is used as the combustion zone for the precalcination process, the installation is considerably simplified.

For the optimum transfer of heat in the precalcination zone obtained in the process according to the invention and particularly for the extremely uniform heat treatment of all the particles of material, it is important above all (in addition to the already mentioned immediately preceding break up of the stream of material in the cooling air stream) for the mixture of material and cooling air to be introduced into the kiln exhaust pipe at different peripheral points in the form of two component streams. In this way the material is immediately distributed substantially uniformly over the entire cross section of the kiln exhaust pipe, i.e., over the entire cross section of the precalcination zone. If provision then is also made for the fuel to be distributed substantially uniformly over this cross section of the precalcination zone, ideal conditions are established for the rapid, complete, and uniform transfer of heat from the fuel to the material.

In one preferred embodiment of the process according to the invention, at least some of the additional fuel added for precalcination is introduced into the pipes carrying the component streams of cooling air, and best at a point situated between the point of entry of the preheated material and the opening of these pipes into the kiln exhaust pipe. If not only the preheated material, but also at least some of the additional fuel is distributed in the component streams of cooling air before they enter the kiln exhaust gas stream immediately afterwards, the flow energy of these component streams of cooling air is simultaneously co-utilized for distributing the fuel so that the above mentioned ideal uniformity of distribution of material, fuel, and gaseous combustion medium is obtained in the precalcination zone.

BRIEF DESCRIPTION OF THE DRAWINGS

These and many other features of the invention will become apparent from the following description of a preferred embodiment illustrated in the accompanying drawings, wherein.

Figure 1:
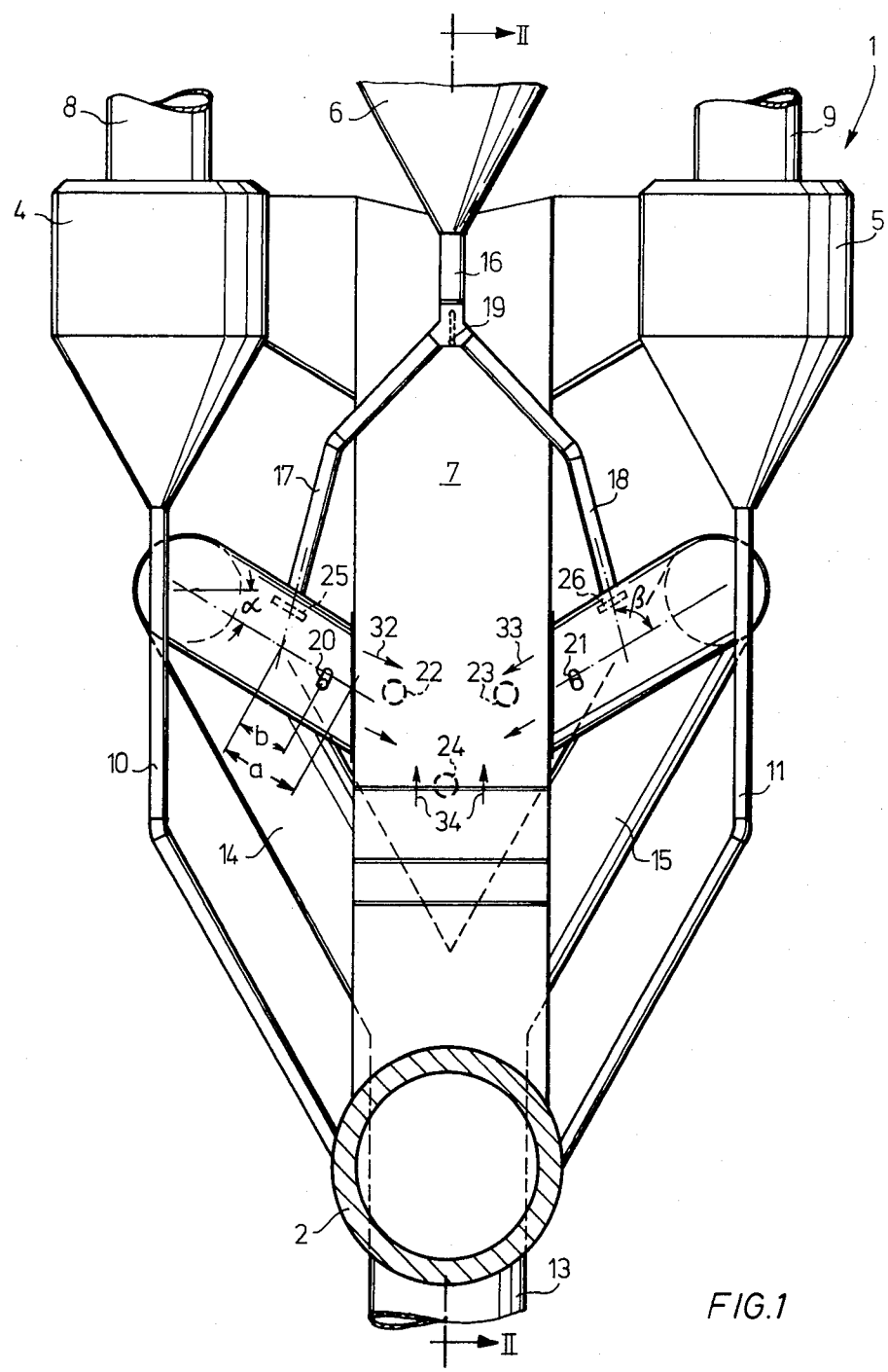
FIG. 1 is an elevation of part of the preheater of an installation according to the invention (as seen from the rotary kiln)

The apparatus illustrated in the drawings for the heat treatment of fine-grained material, particularly for the production of cement, includes multistage cyclone preheater 1 of known construction, a rotary kiln 2 and a cooler 3. These parts of the installation which are known in their general arrangement are shown partly diagrammatically and partly in sectional form only.

Of the multistage cyclone preheater 1, only the lowermost stage consisting of the two cyclones 4 and 5 and the second lowest stage formed by the cyclone 6 are shown. The rotary kiln 2 communicates through a kiln exhaust pipe 7 with the cyclones 4 and 5 whose exhaust pipes 8, 9 lead in known manner to the cyclone 6 of the next preheater stage. The material discharge pipes 10, 11 of the cyclones 4,5 open into the entry housing 12 leading to the rotary kiln 2.

A cooling air pipe 13 leads from the cooler 3 to the kiln exhaust pipe 7. Near the kiln exhaust pipe 7, this cooling air pipe 13 branches into two pipes 14, 15 which initially extend obliquely upwards and outwards, then run obliquely downwards and inwards and open into the kiln exhaust pipe 7 at two diametrically opposite peripheral points. That part of the pipes 14, 15 which extends obliquely downwards and inwards is inclined through an angle $\alpha$ of from 20° to 60° and preferably from 30° to 50° relative to the horizontal.

The material discharge pipe 16 of the cyclone 6 branches into two pipes 17, 18 which open into the cooling air pipes 14, 15. An adjustable distributor 19 is arranged at the branching point.

The angle $\beta$ which the axis of the pipes 17, 18 forms with the axis of the associated cooling air pipes 14 and 15 (looking in the direction of flow of the material and air streams) amounts to between 50° and 85° and preferably to between 60° and 80°.

Letting a represents the distance beween the point of entry of the preheated material into the cooling air pipe (point of intersection of the axes of the pipes 14, 17 and 15, 18) and the opening of the cooling air pipes 14, 15 into the kiln exhaust pipe 7, and letting F designate the cross sectional area of each of the two cooling air pipes 14, 15, the dimension a best amounts to between 0.4 and 1.2 times and preferably to between 0.6 and 0.9 times the square root of the cross sectional area F.

In the illustrated embodiment, burners 20 and 21 are arranged on the cooling air pipes 14 and 15 near their openings into the kiln exhaust pipe 7. Letting b represent the distance between the point of entry of the preheated material (pipes 17, 18) and the burners 20, 21 (as measured in the region of the axis of the pipes 14, 15), this dimension b best amounts to between 0.5 and 1.0 times and preferably to between 0.6 and 0.8 times dimension a.

In addition to or instead of the burners 20, 21, burners may also be provided in the kiln exhaust pipe 7, preferably near or below the opening of the pipes 14, 15, as indicated at 22, 23, 24.

A deflector 25, 26 which breaks up the flow of material may be provided in each of the pipes 14 and 15 below the openings of the material pipes 17, 18.

Figure 2:
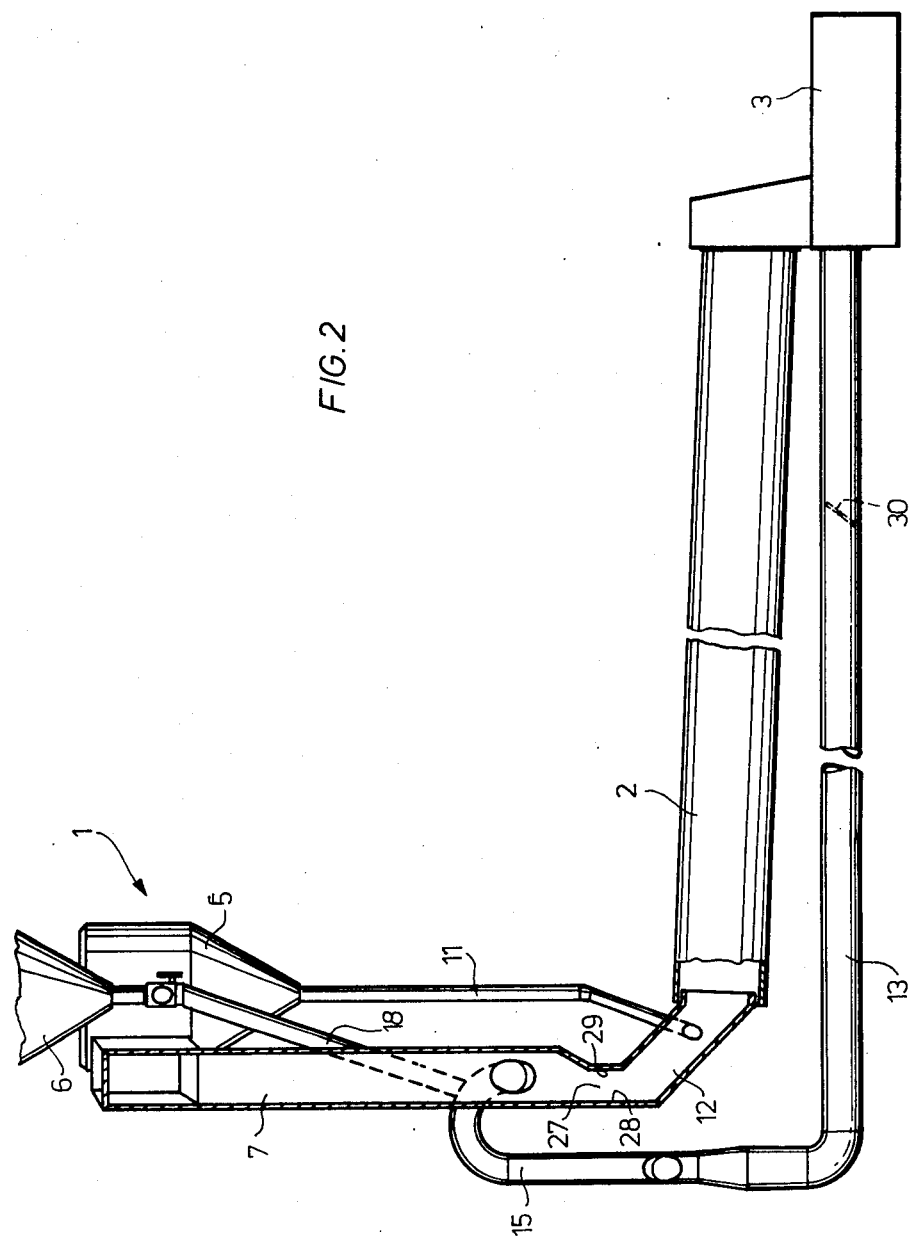
FIG. 2 is a section on the line II—II of FIG. 1.
Figure 3:
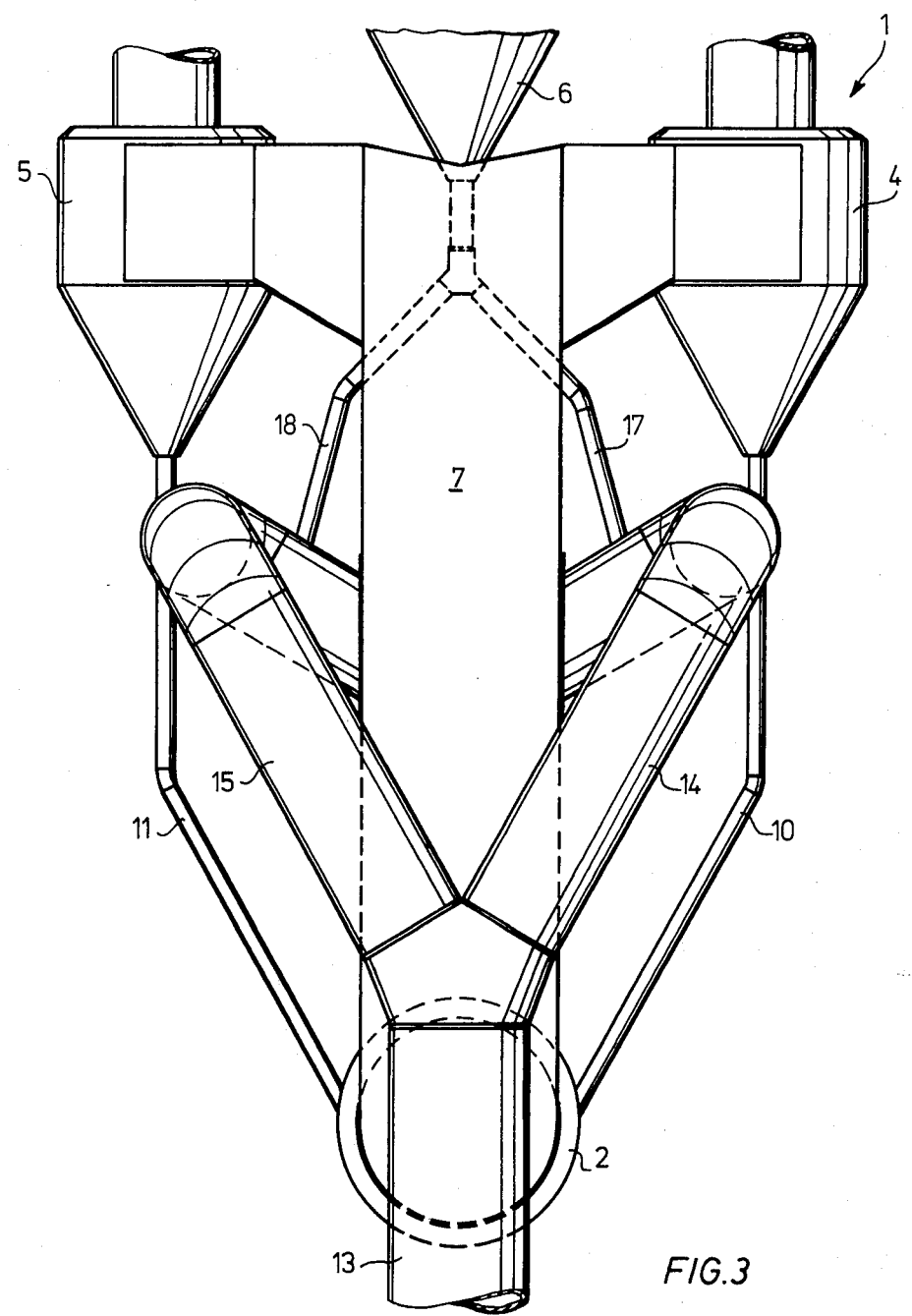
FIG. 3 is an elevation of part of the preheater (as seen from the direction leading away from the rotary kiln).

Below the opening of the pipes 14, 15, the kiln exhaust pipe 7 has a cross sectional constriction 27 (cf. FIG. 2) which is delimited by a substantially flat wall 28 on the outside of the deflected kiln exhaust gas stream and, on the inside thereof, by an inwardly projecting wall 29.

An adjusting element 30 is provided in the cooling air pipe 13 for varying flow resistance.

The operation of the installation is as follows:

The material preheated by the hot gases in several stages of the preheater 1 passes through the material discharge pipes 17, 18 in two component streams into the pipes 14, 15 each of which carries a component stream of the cooling air run off from the cooler 3. On the short journey (distance a) from the point of entry of the material to the opening into the kiln exhaust pipe 7, the two streams of material are broken up in the two component streams of cooling air and mixed with fuel delivered through the burners 20 and 21. The two streams of the fuel/material/air mixture which enter the kiln exhaust pipe 7 at two diametrically opposite points (arrows 32,33) are uniformly distributed over the entire cross section of the kiln exhaust gas pipe 7 in the ascending kiln exhaust gas stream (arrows 34), so that an extremely effective and uniform transfer of the heat content of the additional fuel and the kiln exhaust gases to the material to be precalcined occurs in this precalcination zone.

The material is then delivered in known manner by the gas stream from the pipe 7 to the cyclones 4 and 5 where it is deposited and subsequently enters the rotary kiln 2 through the pipes 10 and 11.

The downward inclination of the cooling air pipes 14, 15 in the region of the junction of the material pipes 17, 18 and the narrow interval between the point of entry of the material and the opening of the air pipes into the kiln exhaust pipe ensure that in the event of a failure in the supply of cooling air to the pipes 14, 15, the material delivered through the material discharge pipes 17, 18 will enter the kiln exhaust pipe 7 under its own weight so that no blockages can occur in the pipes 14 and 15.

On the other hand, introduction of the material into the cooling air pipes 14, 15 ensures that the streams of material are largely broken up in the air stream which provides for considerably more uniform and hence better precalcination conditions by comparison with the direct introduction of material and cooling air into the precalcination zone.

The proximity of the burners 20, 21 to the kiln exhaust pipe 7 ensures that these burners are reliably ignited by the heat from the kiln exhaust gases, even in cases where for operational reasons the temperature of the air from the cooler 3 is too low. In this way, the additional fuel added for precalcination is completely burnt under all operational condition.

We claim:

1. In a process for the heat treatment of fine-grained material such as cement wherein the material is preheated by kiln exhaust gases in a multistage cyclone preheater, further heated in a precalcination zone, burned in a kiln below said preheater, and cooled in a cooler, and wherein a cooling gas stream from the cooler is introduced into a gas pipe connecting the kiln to the preheater and through which the kiln exhaust gases flow upwardly toward the preheater, said gas pipe defining said precalcination zone between said kiln and said preheater, the improvement comprising dividing the cooling gas stream into a plurality of component streams; introducing said component streams into said gas pipe at peripherally spaced points in the region of said precalcination zone and at a downward inclination to the horizontal introducing preheated material from the penultimate cyclone stage of the preheater into each of said component streams upstream from said gas pipe; and combusting fuel in said precalcination zone.

2. Process according to claim 1 wherein said component streams are downwardly inclined at an angle of between 20° and 60° to the horizontal.

3. Process according to claim 1 including introducing said preheated material into said component streams at an angle of between 50° and 85° to the flow path of said streams.

4. Process according to claim 1 including introducing said preheated material into said component streams at an angle of between 60° and 80° to the flow path of said streams.

5. Process according to claim 1 including introducing said preheated material to each of said component streams at a distance from said gas pipe of between 0.4 and 1.2 times the square root of the cross-sectional area of such component stream.

6. Process according to claim 1 including introducing said preheated material to each of said component streams at a distance from said gas pipe of between 0.6 and 0.9 times the square root of the cross-sectional area of such component stream.

7. Process according to claim 1 including introducing fuel into each of said component streams upstream from said gas pipe.

8. Process according to claim 7 including introducing fuel into each of said component streams downstream from the introduction thereto of said preheated material.

9. In apparatus for the heat treatment of fine-grained material such as cement having a multistage cyclone preheater for preheating such material, a kiln below said preheater for burning such material, a cooler for cooling burned material, a gas pipe extending between said kiln and said preheater for conducting kiln exhaust gases upwardly toward said preheater and forming a precalcining zone between said kiln and said preheater, and conduit means extending between said cooler and said gas pipe for delivering cooling gas to the latter, the improvement wherein said conduit means comprises a plurality of branches communicating with said gas pipe at peripherally spaced points in the region of said precalcination zone and downwardly inclined to the horizontal; means for delivering preheated material from the penultimate cyclone stage of said preheater to each of said branches and upstream from said gas pipe; and means for introducing fuel into said precalcining zone.

10. Apparatus according to claim 9 wherein said component streams are downwardly inclined at an angle of between 20° and 60° to the horizontal.

11. Apparatus according to claim 10 wherein the means for delivering preheated material to said branches is inclined at an angle of between 50° and 85° to the associated branch.

12. Apparatus according to claim 10 wherein the means for delivering preheated material to said branches is inclined at an angle of between 60° and 80° to the associated branch.

13. Apparatus according to claim 9 wherein upstream distance between said gas pipe and each of said preheated material delivering means is between 0.4 and 1.2 times the square root of the cross-sectional area of the associated branch.

14. Apparatus according to claim 9 wherein upstream distance between said gas pipe and each of said preheated material delivering means is between 0.6 and 0.9 times the square root of the cross-sectional area of the associated branch.

15. Apparatus according to claim 9 wherein the means for introducing fuel communicates with said gas pipe via said branches and upstream from said gas pipe.

16. Apparatus according to claim 15 wherein the means for introducing fuel communicates with said gas pipe via said branches and downstream from said preheated material delivering means.

17. Apparatus according to claim 16 wherein the distance between said material delivering means and said fuel delivering means amounts to between 0.5 and 1.0 times the distance from said material delivering means and said gas pipe.

18. Apparatus according to claim 16 wherein the distance between said material delivering means and said fuel delivering means amounts to between 0.6 and 0.8 times the distance from said material delivering means and said gas pipe.

19. Apparatus according to claim 9 wherein said penultimate stage of said preheater comprises a single cyclone having a discharge pipe joined to branch pipes corresponding in number to the number of said branches, and including adjustable distributor means at the juncture of said discharge pipe with said branch pipes.

20. Apparatus according to claim 9 wherein said gas pipe has a cross-sectional constriction at a level below that at which said branches communicate with said gas pipe, and wherein said constriction is defined by flat, opposed walls forming parts of said gas pipe.

21. Apparatus according to claim 9 including material deflector means in each of said branches adjacent the associated material delivering means.

* * * * *